United States Patent [19]
Kadowaki et al.

[11] 3,715,018
[45] Feb. 6, 1973

[54] CLUTCH ENGAGING AND DISENGAGING DEVICES

[75] Inventors: Tatsusuke Kadowaki, Midori-ku, Yokohama-shi, Kanagawa-ken; Makoto Kurasawa, Sumida-ku, Tokyo, both of Japan

[73] Assignee: Kabushiki Kaisha Ricoh, Tokyo, Japan

[22] Filed: Dec. 17, 1970

[21] Appl. No.: 99,074

[30] Foreign Application Priority Data

Dec. 22, 1969  Japan ............................ 44/122091

[52] U.S. Cl. .................. 192/24, 192/33 R, 192/89 A
[51] Int. Cl. ........................................... F16d 11/06
[58] Field of Search ...... 192/101, 89 A, 67 R, 24, 25, 192/33 R

[56] References Cited

UNITED STATES PATENTS

| | | | |
|---|---|---|---|
| 876,053 | 1/1908 | Heard | 192/24 |
| 958,710 | 5/1910 | Biggert | 192/24 |
| 1,367,309 | 2/1921 | Dunham | 192/24 |
| 1,581,678 | 4/1926 | Chesley | 192/24 |
| 1,885,420 | 11/1932 | Dorman | 192/24 |

Primary Examiner—Benjamin W. Wyche
Assistant Examiner—Randall Heald
Attorney—John J. McGlew and Alfred E. Page

[57] ABSTRACT

A clutch includes an axially fixed member and an axially movable member arranged coaxially of each other for interengagement. The rotatable axially movable member has a rib projecting from its circumferential periphery and inclined to the generating line of the periphery. A pin is mounted on the end of a pivoted lever and extends toward the periphery of the axially movable clutch member, and may be moved into engagement therewith to engage a side surface of the rib. When the pin engages the side surface of the rib, the rotatable clutch member is displaced axially to disengage the axially fixed clutch member. The opposite side edge of the rib preferably is bevelled, and spring means may be provided to bias the axially movable clutch member in a direction opposite to the direction of displacement thereof by engagement of the pin with the rib.

5 Claims, 7 Drawing Figures

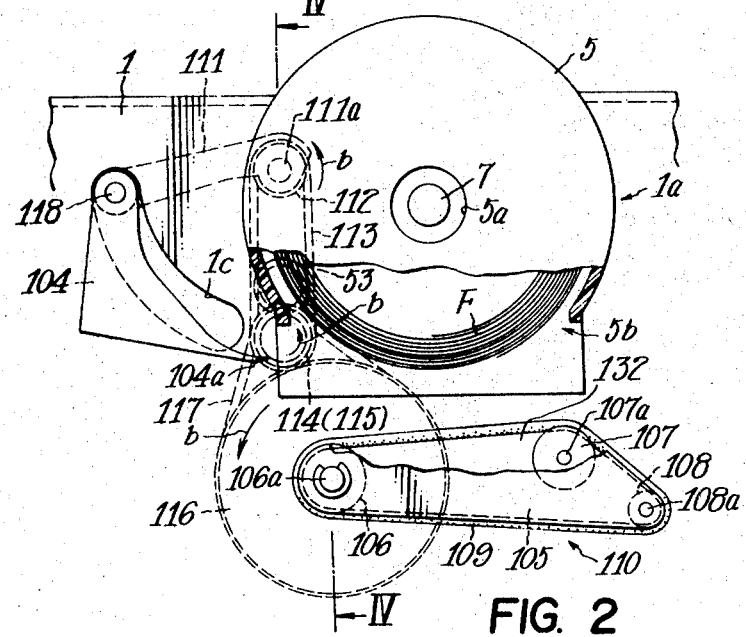
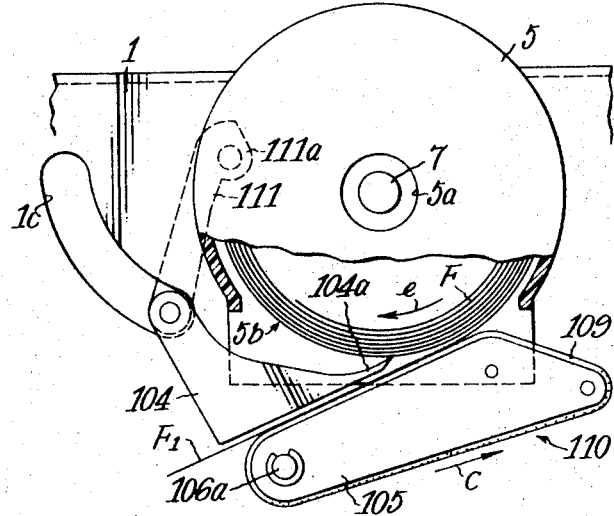

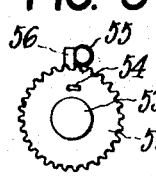
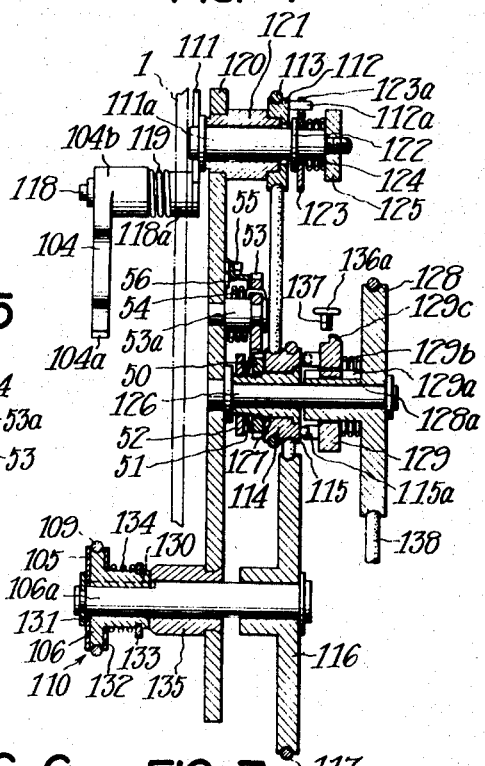
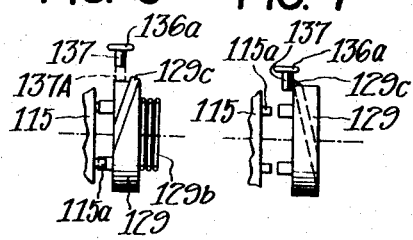

CLUTCH ENGAGING AND DISENGAGING DEVICES

BACKGROUND OF THE INVENTION

Clutches are used for connecting and disconnecting two rotating shafts, and are divided into two general types. One type is known as a claw clutch wherein projections on two clutch members are interengaged or are disengaged from each other, and the other type is a friction clutch wherein the engageable and disengageable clutch surfaces are arranged to have frictional engagement with each other.

A clutch is generally engaged or disengaged by moving an axially slidable clutch ring by a shifter or the like. With such an arrangement, it is required to impart a relatively large force to the shifter, and this is particularly true in the case of a claw clutch. As a result, when it is desired to engage or disengage a clutch automatically, difficulty is experienced in effecting positive engagement and disengagement of the clutch particularly if the input signal for the shifter is low in power.

SUMMARY OF THE INVENTION

This invention relates to clutches for connecting and disconnecting two rotating shafts and, more particularly, to a novel clutch operating mechanism providing for positive engagement and disengagement of a clutch even if an input signal is low in power. In accordance with the invention, a clutch operating pin is brought into pressing engagement with the peripheral surface of an axially slidable clutch ring which is juxtaposed with an axially fixed clutch ring. The axially slidable clutch ring has a rib projecting radially from its periphery and inclined with respect to the generating lines of the axially slidable clutch ring. Thus, when the pin is brought into engagement with a side surface of the rib, the axially slidable clutch ring is axially displaced relative to the axially fixed clutch ring.

The invention arrangement has the particular advantage that only a very small force is necessary to bring the clutch operating pin into and out of pressing engagement with the peripheral surface of the axially slidable clutch ring, so that transmission of power can be readily either effected or interrupted.

An object of the invention is to provide an improved clutch engaging and disengaging mechanism.

Another object of the invention is to provide such a mechanism capable of effecting positive engagement and disengagement of two juxtaposed and rotatable clutch members.

A further object of the invention is to provide such a mechanism requiring only a very small input power or signal to effect operation of the clutch.

For an understanding of the principles of the invention, reference is made to the following description of a typical embodiment thereof as illustrated in the accompanying drawing.

BRIEF DESCRIPTION OF THE DRAWING

In the Drawing:

FIG. 1 is a side elevation view, partly in section, of an automatic film feed device for a small movie projector, and provided with the clutch engaging and disengaging device embodying the invention;

FIG. 2 is a view similar to FIG. 1 but showing the film feed device in the operative position;

FIG. 4 is a sectional view taken along the line IV—IV of FIG. 1;

FIG. 5 is a side elevation view illustrating the film stripper pawl restoring mechanism;

FIG. 6 is a side elevation view of one embodiment of a clutch engaging and disengaging device in accordance with the invention; and FIG. 7 is a view similar to FIG. 6 but illustrating the clutch in the operated position.

DESCRIPTION OF THE PREFERRED EMBODIMENT

Figure 3:
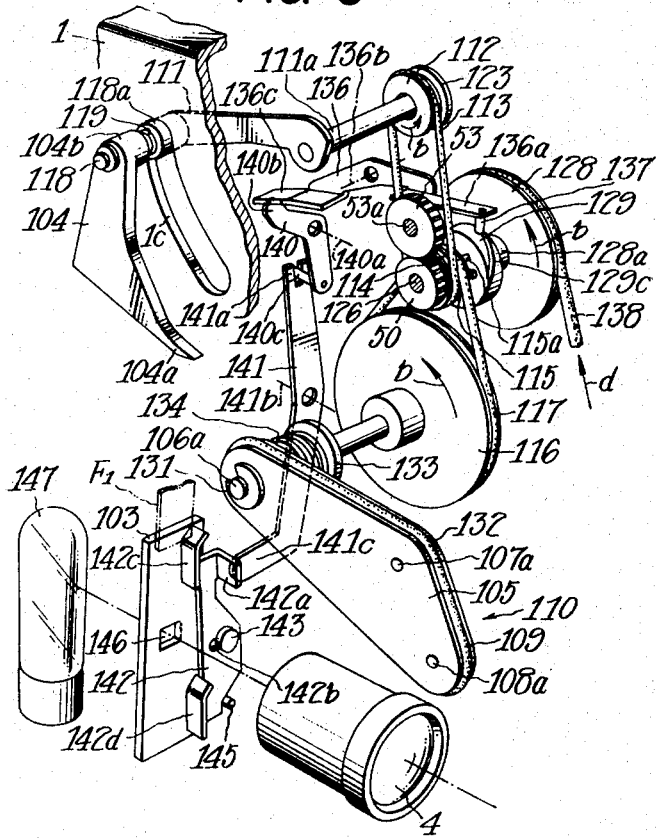
FIG. 3 is a somewhat exploded perspective view showing the construction of the film feed device of FIGS. 1 and 2.

The clutch engaging and disengaging device or mechanism of the invention is applicable to any machine in which it is required to effect or to interrupt transmission of power. However, and for the sake of convenience, the invention will be described as incorporated in a movie projector of the type using a film cartridge.

Referring to FIGS. 1 and 2, a film cartridge 5, such as an Eastman Kodak Company super 8 mm. cartridge, is mounted on a cartridge attaching portion 1a of a side wall 1 of a movie projector, having a film feed spindle 7 inserted in a reel opening 5a of cartridge 5 which latter is held in place by suitable holding means (not shown) with its film supply feed port 5b being directed downwardly.

A film stripper pawl 104 is provided on one side of port 5b of cartridge 5, and a threader 110, comprising pulleys 106, 107 and 108 supported by support plates 105 and 132, and a circular cross-section belt 109 trained about these pulleys, is provided below port 5b. The manner of operation of film stripper pawl 104 and threader 110, when cartridge 5 is mounted on portion 1a of the projector housing, will be described hereinafter.

Stripper pawl 104 is connected to a support arm 111 through a slot 1c formed in side wall 1 of the projector housing, and arm 111 is secured to an end of a stripper pawl operating shaft 111a having a pulley 112 connected to its opposite end and connected by an endless belt 113 to a pulley 114. Slot 1c is arcuate, and is centered at the axis of shaft 111a. A threader operating shaft 106a, supporting pulley 106, is maintained in frictional engagement with support plates 105 and 132 and is connected, through a pulley 116 and a belt 117, to a pulley 115 (see FIG. 3) which is integral and coaxial with pulley 114.

Pulleys 114 and 115 are adapted to be rotated in the direction of the arrow b in FIG. 3 by a driving shaft, described hereinafter, which begins to rotate responsive to operation of a starting button (not shown) of the projector. Upon rotation of pulleys 114 and 115, stripper pawl 104 pivots counterclockwise about shaft 111a so that a forward end 104a of pawl 104 is brought into engagement with the peripheral surface of the roll of film F in cartridge 5. Correspondingly, support plates 105 and 132 of threader 110 pivot counterclockwise about shaft 106a, to bring belt 109 into engagement with the peripheral surface of the roll of film F in the cartridge.

FIG. 2 shows pawl 104 and threader 110 in the operative positions in which belt 109 is moving in the direction of the arrow c while pressed against the peripheral surface of the roll of film F to move a leading end portion F1, separated from the roll by the forward end 104a of pawl 104, to deliver this leading end toward a portion of a film pressing plate 103 or a film gate through the medium of a film feed ring (not shown). If leading end portion F1 is introduced into the film gate, a detection member 142, illustrated in FIG. 3 and described hereinafter, is actuated to disconnect pulleys 114 and 115 from the driving shaft to stop rotation of these pulleys. This restores stripper pawl 104 and threader 110 to their inoperative or rest positions as shown in FIG. 1. Thereafter, film F is intermittently advanced by film pull-down claws (not shown) in the film gate. An automatic film feed device capable of performing the mentioned operation will be described hereinafter.

Referring to FIG. 3, pawl 104 has a cylindrical hub 104b which is rotatably mounted on a minor diameter portion of a shaft 118 which also has a major diameter portion 118a loosely received in slot 1c and secured at its end to the free end of support arm 111. A spring 119 embraces shaft 118 between the major diameter base portion 118a and the cylindrical hub 104b of stripper pawl 104, to urge pawl 104 to pivot clockwise, as viewed in FIG. 1, about shaft 118. Such pivoting of stripper pawl 104 is restricted by a suitable stop (not shown) provided on arm 111, so that the stripper pawl can be maintained in a suitably inclined position.

Operating shaft 111a is rotatably journalled by a bearing 121 secured to a support plate 120, as best seen in FIG. 4, and a pulley 112 is rotatably connected to the inner end of bearing 121. A pin 112a on the side surface of pulley 112 is maintained in engagement with a cut-out or notch 123a of a friction wheel 123 loosely mounted on shaft 111a through the medium of a flange 122 secured to shaft 111a. A nut 125 is threaded on shaft 111a and, through a spring 124, biases friction wheel 123 and flange 122 of shaft 111a into frictional engagement with each other. As shown in FIG. 4, pulleys 114 and 115 are integral with each other and are rotatably supported by a sleeve 127 telescoped loosely over a shaft 126 secured to support plate 120. A driving pulley 128, having a cylindrical hub 128a, is rotatably mounted on the inner end portion of shaft 126, and a clutch ring 129 is mounted, through a key 129a, on hub 128a in a manner such that clutch ring 129 is rotatable with hub 128a as a unit but is slidable axially of the hub. Clutch ring 129 is disposed in a position corresponding to the position of a clutch portion 115a on a side surface of pulley 115, and is normally biased to engage clutch portion 115a by a spring 129b embracing hub 128a and engaged with ring 129 and pulley 128.

A gear 50 is loosely mounted on the base portion of sleeve 127, and a stop ring 52 is threaded on sleeve 127 and engages a plate spring 51 which is engaged with gear 50. Plate spring 51 biases gear 50 into engagement with pulley 114, so that these two elements are frictionally connected to each other. A gear 53 meshes with gear 50 and is rotatable on a shaft 53a secured to support plate 120. A spiral spring 54, mounted on shaft 53a, has one end connected to gear 53 and its other end connected to a pin 55 on support plate 120. Gear 53 is adapted to rotate clockwise, as viewed in FIG. 5, about shaft 53a as the resilient potential energy stored in spiral spring 54 is released. The range of rotation of gear 53 is restricted by an engaging member 56, secured to a side of gear 53, and abutting against pin 55. With member 56 engaging pin 55, shaft 111a, mounting support arm 111, is rendered inoperative, because the major diameter portion 118a of shaft 118 secured to support arm 111 engages the upper end edge of slot 1c, so the stripper pawl 104 is brought to the inoperative position as shown in FIG. 1.

Pulleys 106 of threader 110 is secured to rotate with shaft 106a through the medium of a key 130. Support plate 105 is loosely mounted adjacent a side surface of pulley 106, and retained in position by an E-ring 131. Support plate 132 is loosely mounted on the hub of pulley 106, and a spring 134, embracing this hub between plate 132 and a flange 133 on the hub biases plate 132 into frictional engagement with pulley 106. Pulley 116 is secured to an inner end of shaft 106a which is journalled by a bearing 135 secured to support plate 120, and a belt 117 is trained about pulleys 116 and 115.

Plates 105 and 132 of threader 110 rotatably support shafts 107a and 108a of the respective pulleys 107 and 108, and belt 109 is trained about pulleys 106, 107 and 108. Plates 105 and 132 are designed so that their upper edges are disposed at a level below the outer periphery of belt 109, as shown in FIG. 1, so that this outer periphery of belt 109 can press against the periphery of the roll of film F. When the threader operating shaft 106a is inoperative, the threader is moved away from the roll of film F, as shown in FIG. 1, and a suitable stop (not shown) is provided to limit the downward movement of threader 110.

A rib 129c, inclined with respect to the generating lines of clutch ring 129, projects radially from the periphery of this ring, and a pin 137, secured to the end of a resilient plate 136a mounted on a lever 136, projects toward the periphery of clutch ring 129. Lever 136 is pivotally supported by a shaft 136b (see FIG. 3) and biased by a spring, which has not been shown, to pivot counterclockwise about shaft 136b. Thus, pin 137 normally is displaced away from clutch ring 129 which is in engagement with pulley 115. A circular cross-section belt 138 is trained about driving pulley 128 which latter is connected to a main shutter shaft (not shown) through belt 138. This belt is adapted to move in the direction of the arrow d, as shown in FIG. 3, so that it imparts rotation to pulley 128, clutch ring 129, pulley 115 and pulley 114 when clutch ring 129 is engaged with pulley 115, so that all the pulleys rotate in the same direction, or in the direction of the arrow b.

If pin 137 is moved toward ring 129 by clockwise pivoting of lever 136 about shaft 136b in FIG. 3, into the broken line position 137A shown in FIG. 6, and in which it is positioned against the periphery of ring 129, a side wall of rib 129c rubs against pin 137. Rib 129c is designed so that it rubs against pin 137 when clutch ring 129 rotates in the direction of arrow b, so that ring 129 is moved away from clutch portion 115a of pulley 115 against the bias of spring 129b. As the inwardly moving pin 137 disengages rib 129c, it engages the side surface of clutch ring 129, as shown in FIG. 7, so as to maintain ring 129 disengaged from clutch portion 115a of pulley 115.

When ring 129 rotates in a direction opposite to arrow b, pin 137 engages that side surface of rib 129c opposite to the side surface of the rib engaged by pin 137 as shown in FIG. 6. This opposite side surface of rib 129c is bevelled so that pin 137 rides over rib 129c, assisted by resilient plate 136a, whenever rib 129c is brought into engagement therewith during rotation of the parts. Thus, clutch ring 129 remains engaged with pulley 115. Pin 137 and rib 129c constitute the clutch engaging and disengaging device of the invention and which, in the particular embodiment selected for illustration, maintain clutch ring 129 and pulley 115 disengaged from each other.

When pulley 112 rotates in the direction of arrow b, its rotation is transmitted, through pin 112a, friction wheel 123, flange 122 and operating shaft 111a, to rotate If shaft. It shaft 111a is rotated, support arm 111 pivots counterclockwise about shaft 111a and, as a result, portion 118a of shaft 118 (FIG. 3) pivots counterclockwise in slot 1c so that stripper pawl 104 is also pivoted in the same direction. The counterclockwise pivoting of support arm 111 is stopped by base portion 118a engaging the lower end edge of slot 1c. Since flange 122 (FIG. 4) and friction wheel 123 on shaft 112 are frictionally engaged at this time, excess driving force, otherwise exerted on support arm 111, is absorbed by the frictional connection so that support arm 111 is held in its operative position as shown in FIG. 2. If arm 111 is maintained in a position such that shaft portion 118a engages the lower edge of slot 1c, then stripper pawl 104 engages its forward end 104a against the outer peripheral surface of the roll of film F, as shown in FIG. 2.

Correspondingly, when pulley 116 rotates in the direction of arrow b, its rotation is transmitted to threader operating shaft 106a so that pulley 106 begins to rotate and, at the same time, support plates 105 and 132, frictionally engaged with pulley 106, pivot counterclockwise, as viewed in FIG. 1, about shaft 106a to bring belt 109 into pressing engagement with the periphery of the roll of film F, while belt 109 moves in the direction of the arrow c as shown in FIG. 2. With the belt engaging the periphery of the roll of film F, slip occurs between plates 105 and 132, and the excess driving force, otherwise exerted by pulley 106 on plates 105 and 132, is absorbed by this slip. As a result, plates 105 and 132 are maintained in a position in which the belt is in contact with the roll of film F as shown in FIG. 2.

Pawl 104 engages the roll of film slightly earlier than does threader 110, so that belt 109 presses against the periphery of the roll of film slightly after the forward end 104a of pawl 104 engages this periphery, with the result that the roll of film is rotated in the direction of the arrow e (see FIG. 2).

When the roll of film F begins to rotate, leading portion F1 of the film is stripped from the roll by the forward end 104a of pawl 104, and moved, by belt 109, downwardly and to the left as viewed in FIG. 2. At this time, the leading end F1 of film F passes between the lower edge of pawl 104 and belt 109. Pawl 104 and belt 109 are designed so that a suitable clearance can be maintained between these parts by varying the degree of inclination in dependence on the diameter of the roll of film F.

Referring again to FIG. 3, one arm 140b of a lever 140 pivoted on a shaft 140a abuts the other arm 136c of lever 136 from below. A pin 140c, attached to arm 140b, engages in a bifurcated portion 141a of a lever 141 pivotally supported by a shaft 141b. Lever 141 has an arm 141c which abuts against a bent portion 142a of a film detector 142 which is formed with a slot 142b having its major dimension extending horizontally and receiving a screw 143 for loosely mounting detector 142 on one side of a film gate plate 103 disposed rearwardly of the film pressing plate. A lower side edge of detector 142 abuts a stop 145. Bent portion or ear 142a of detector 142 is urged toward the film gate section by lever 136 through levers 140 and 141, so that detector 142 is urged to pivot counterclockwise about stop 145. This counterclockwise movement of detector 142 is restricted by slot 142b.

Film guides 142c and 142d are provided at the upper and lower marginal portions of detector 142 adjacent film gate plate 103. A film guide plate, which has not been shown, extends vertically on a side of film gate plate 103 opposite detector 142. This film gate plate is designed so that, when film detector 142 is in the position shown in FIG. 3, in which it is inclined, the distance between film guide 142d and the film guide plate is equal to the width of film F. Accordingly, if leading end F1 of the film is introduced into the film pressing plate section, it will move film guide 142c of detector 142 in the direction opposite to that in which the detector 142 normally is urged to move. This movement of guide 142c causes detector 142 to pivot clockwise about stop 145, and causes bent portion or ear 142a to push and move pivoted lever 141. Lever 141 pivots counterclockwise about shaft 141b and causes, through its bifurcated portion 141a, lever 140 to pivot clockwise about shaft 140a.

During its pivotal movement, lever 140 pushes upwardly, through its arm 140b, arm 136c of lever 136 against the force which normally urges lever 136 to move downwardly. Thus, lever 136 pivots clockwise about shaft 136b and, as a result, pin 137 is brought into engagement with the periphery of clutch ring 129 and moves clutch ring 129 away from pulley 115, thus disengaging pulley 115 from driving pulley 128. Pulley 115 remains operatively disconnected from pulley 128 while film F is disposed in the film gate section or while the film is being fed through the film gate section.

Referring to FIG. 3, gear 50 rotates in the direction of arrow b due to its frictional engagement with pulley 114, when the latter rotates in the direction of arrow b, and rotates gear 53 counterclockwise as viewed in FIG. 5. Gear 53 rotates until member 56 abuts pin 55 on that side of the latter opposite to the side engaged when the parts are in the position shown in FIG. 5, thereby charging spiral spring 54 and storing resilient potential energy therein. When gear 53 stops rotating after charging spring 54, gear 50 also stops rotating, with the driving force exerted on gear 50 by pulley 114 being absorbed by the frictional connection therebetween. Gears 50 and 53 remain in this state until clutch ring 129 and pulley 115 are disengaged, whereupon the resilient potential energy stored in spring 54 is released and causes gear 53 to rotate in the opposite direction, or clockwise as viewed in FIG. 5.

Such clockwise rotation of gear 53 rotates gear 50 in a direction opposite to the direction of arrow b, and its rotation is transmitted to pulleys 114 and 115. Rotation of pulley 114 in a direction opposite to arrow *b* rotates shaft 111a in the same direction through pulley 112. As a result, stripper pawl 104 is moved away from the roll of film F and returned to the position of FIG. 1. Correspondingly, upon rotation of pulley 115 in a direction opposite to arrow *b*, pulley 116 rotates in the same direction so that threader 110 is restored to its original position by virtue of this rotation and also by its own weight. At this time, stripper pawl operating shaft 111a and threader operating shaft 106a both rotate in normal direction so that they do not interfere with each other.

If leading end F1 of film F is introduced into the film gate section, as shown in FIG. 3, film detector 142 is moved as mentioned. Movement of detector 142 releases clutch ring 129 from engagement with pulley 115, so that stripper pawl 104 and threader 110 are moved away from the roll of film F and return to their original positions as shown in FIG. 1. Thereafter, film F moves past aperture 146 in film gate plate 103 and is illuminated by a light source 147 to project pictures onto a screen which has not been shown. The usual film pull-down claws (not shown) are provided near aperture 146 for intermittently advancing film F. The clutch remain disengaged while film F is disposed in the film gate section, and this permits smooth rewinding of the film upon completion of projection.

When an open reel is attached to the projector, it is only necessary to insert the leading end portion of the film manually between stripper pawl 104 and threader 110 when they are disposed in the feeding positions shown in FIG. 2.

As mentioned, film F in cartridge 5 can be fed automatically to the film gate by pawl 104 and threader 110, in the movie projector shown and described above. If pawl 104 and threader 110 were disposed in the film feed positions after film F has been introduced into the film gate, there would be interference with the projection operation of the projector. This problem is obviated, in the illustrated projector, in the following manner. Introduction of film F into the film gate section is detected by member 142, and actuation of member 142 is transmitted to pin 137 and clutch ring 129 as an input signal. Correspondingly, clutch ring 129 is disengaged from pulley 115, thus restoring pawl 104 and threader 110 to their original positions shown in FIG. 1.

The force with which film F presses against detector member 142 is relatively small and not sufficiently large to engage and disengage the clutch by a conventional engaging and disengaging means. The clutch engaging and disengaging device of the invention is effective readily to move clutch ring 129 away from pulley 115 by merely bringing pin 137 into abutment with rib 129c on ring 129, so that the invention device permits effecting operation of the clutch satisfactorily with a small force.

It will be understood that the clutch engaging and disengaging device embodying the invention is not limited to the specific embodiment shown and described, and that either the fixed clutch member, corresponding to pulley 115, or the movable clutch member, corresponding to clutch ring 129, may be used as a driving member depending upon the type of application. Furthermore, the shape of the rib, the manner of its mounting, and the angle of its inclination may be decided suitably in designing the device by taking into consideration the direction of rotation of the ring and the manner and mounting of the spring. The device embodying the invention can be used not only with a claw clutch but also with a friction clutch, and can be incorporated not only in movie projectors but also in any apparatus employing a clutch.

While a specific embodiment of the invention has been shown and described in detail to illustrate the application of the principles of the invention, it will be understood that the invention may be embodied otherwise without departing from such principles.

What is claimed is:

1. A clutch mechanism comprising, in combination, a first axially fixed rotatable clutch member and a second axially movable rotatable clutch member arranged coaxially of each other with interengageable clutch surfaces in facing relation; a rib projecting radially from the circumferential periphery of said second clutch member and inclined, circumferentially of said periphery, with respect to the generating line of said periphery; said rib having a first side surface facing toward said first clutch member and an opposite side surface facing away from said first clutch member; and a clutch operator including a pin adjacent and projecting toward said periphery, said pin, when moved toward said periphery, engaging said first side surface of said rib, during rotation of said second clutch member, to shift said second clutch member axially relative to said first clutch member; said opposite side surface of said rib being bevelled to facilitate said pin riding there-over to engage said first side surface.

2. A clutch mechanism, as claimed in claim 1, in which said rib has a circumferential extent less than that of said periphery and terminates, at each end, at a respective side surface of said second clutch member.

3. A clutch mechanism, as claimed in claim 1, including spring means biasing said second clutch member to move axially in a direction opposite to the direction in which it is moved by engagement of said pin with said first side surface of said rib.

4. A clutch mechanism, as claimed in claim 3, in which said spring means biases said second clutch member into engagement with said first clutch member.

5. A clutch mechanism, as claimed in claim 1, in which said clutch operator includes a lever pivoted intermediate its ends and carrying said pin at one end thereof; and clutch operating means engageable with the opposite end of said lever.

* * * * *